Aug. 16, 1955  R. H. BLACK  2,715,281
PLUG GAUGES
Filed April 17, 1953

ROBERT H. BLACK
INVENTOR.

BY Hazard & Miller
ATTORNEYS

United States Patent Office

2,715,281
Patented Aug. 16, 1955

2,715,281

PLUG GAUGES

Robert H. Black, Los Angeles, Calif., assignor to Deltronic Corporation, Los Angeles, Calif., a corporation of California Application April 17, 1953, Serial No. 349,492

2 Claims. (Cl. 33—178)

This invention relates to improvements in sets of combined plug gauges and lay out pins.

The primary object of the invention is to provide a set of combined plug gauges and lay out pins in the form of rod-like bodies, each of which has cylindrical ends of the same diameters concentrically arranged with respect to each other, with one of the bodies having its ends of a diameter that may be regarded as nominal and the other bodies having their ends of diameters differing from the nominal diameter by equal amounts or differences which progressively increase and decrease.

The conventional plug gauge usually has cylindrical ends which are of unequal diameters and which usually are not concentric with respect to each other, inasmuch as no effort is made in the course of their construction to make them concentric. The diameters selected on the conventional plug gauge are the "go" and "no go" limits. In the course of their use, the smaller end or "go" end of the plug gauge is inserted in the hole to be tested to determine that the hole is of adequate size. Then, by reversing the plug gauge end for end and applying it to the hole, it is determined that the hole is not oversized, if the large end of the gauge does not enter the hole.

With a given set of tolerances permitted, the smaller end is made of a size corresponding to the lowest tolerance and the large end is made of a size corresponding to the greatest tolerance. If the tolerances on the work being done are changed, it is necessary to obtain a new plug gauge wherein the diameter of the smaller end conforms to the new smallest tolerance and the diameter of the large end conforms to the new large tolerance.

In accordance with the present invention, the manufacture of a plug gauge to meet each of the various tolerance requirements is eliminated in that those plug gauges whose ends have the required diameters to meet the tolerance requirements can be selected and utilized as "go" and "no go" gauges. If the tolerance requirements are changed, it is merely necessary to select two other plug gauges from the set to comply with the changed requirements.

In prior plug gauges, no effort has been made to have the two ends of the plug gauge concentric with each other and in actual practice absolute concentricity seldom existed. Consequently, the lack of concentricity together with the inequality in the diameter of the two ends have prevented such plug gauges from being satisfactorily employed for lay out pins. By means of the present plug gauges, the concentricity and equality in diameters of the two ends enables the plug gauges to be satisfactorily employed for this purpose.

With the foregoing and other objects in view, which will be made manifest in the following detailed description and specifically pointed out in the appended claims, reference is had to the accompanying drawings for an illustrative embodiment of the invention, wherein:

Figure 1:
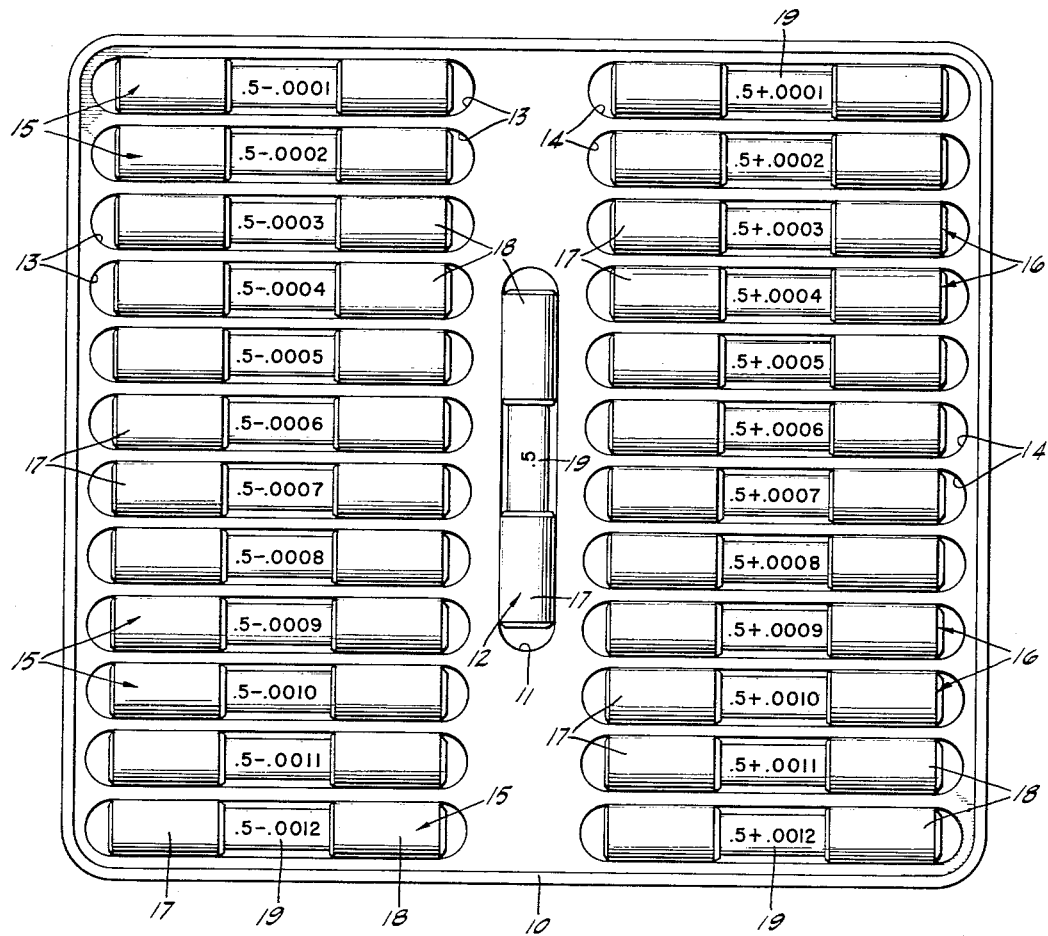
Figure 1 is a top plan view of a set of plug gauges embodying the present invention, showing the same disposed in a suitable container or case.
Figure 2:
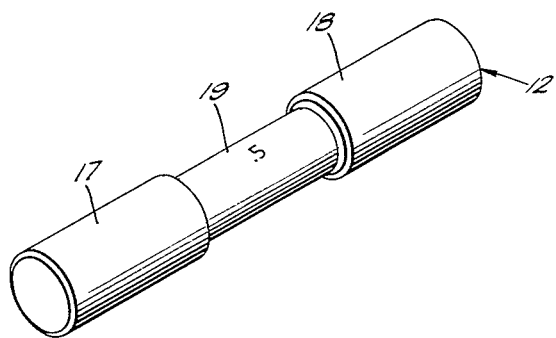
Fig. 2 is a perspective view of the nominal plug gauge shown in Fig. 1.

Referring to the accompanying drawings wherein similar reference characters designate similar parts throughout, the set of plug gauges embodying the present invention is preferably maintained in a suitable case, the bottom of which is indicated at 10 and in which there is a central pocket 11 designed to receive a nominal plug gauge 12. There are additional pockets at both sides of the pocket 11 indicated at 13 and 14 which receive a row of plug gauges 15 and a similar row 16.

All plug gauges of the entire set have the following general characteristics. They are made of a hard or hardenable metal and are shaped so as to have two cylindrical portions 17 and 18 at their ends. These cylindrical surfaces are produced by grinding the blank on a centerless grinder so that the two surfaces 17 and 18 on each gauge have diameters which are exactly equal to each other and are also concentric with relation to each other. The central portion of the blank is of reduced diameter, as indicated at 19, and may have the size of the gauge imprinted thereon. The central plug gauge 12 may be regarded as the nominal plug gauge which, as illustrated, is one-half inch indicated by having .5 dyed or otherwise impressed thereon. This signifies that both cylindrical ends 17 and 18 have a diameter equal exactly to one-half inch.

The plug gauges of the row 15 are similar to the nominal gauge but have the sizes of their cylindrical end portions of progressively increasing decrements. Thus, the uppermost plug gauge of the row 15 is .0001" less than ½". The next lower plug gauge of the row 15 has the diameter of its end portions .0002" less than ½". The balance of the row 15 is made up of plug gauges whose end portions progressively decrease in size from ½" by successive equal decrements of $1/10,000$ of an inch. The plug gauges of the row 16 are conversely formed in that their sizes progressively increase in successive equal increments of $1/10,000$ of an inch.

In a given piece of work if the tolerance of a hole is from plus $3/10,000$ to minus $5/10,000$ with relation to a nominal ½", appropriate gauges can be selected from the two rows 16 and 15 to meet these requirements. On the other hand, if a tolerance is from plus $5/10,000$ to minus 0, the nominal gauge 12 may be used to meet with a plug gauge selected from the row 16. As another illustration, if the tolerance permitted is plus 0 and minus $6/10,000$ the nominal gauge 12 may be used in conjunction with the plug gauge selected from the row 15. Any combination of gauges may be used to meet various tolerance requirements and if the tolerance requirements are changed, this merely involves the selection of different plug gauges from the set.

The improved plug gauges may be used not only for determining whether hole sizes conform to specified tolerance requirements. They may also be used for lay out pins. Thus, in a given piece of work, if a hole has been drilled and has been definitely located, one of the plug gauges from the set which will exactly fit the hole may be used and positioned therein. Thus, if the end 17 is inserted into the hole and accurately fits it, the surface 18 being of the same diameter and absolutely concentric with the surface 17 can be utilized in measuring the distance to the center of another hole that is to be formed in the work a specified distance away. If the hole that has been initially drilled is too large for the end 17 of the nominal plug gauge to be used, one of the gauges from the row 16 is selected by trial and error until a gauge that perfectly fits the hole is found. That end of the plug gauge which protrudes from the hole being concentric with the end which is fitting the hole provides an accurate datum from which measurements may be made.

From the above described construction, it will be appreciated that an improved set of plug gauges has been provided which differs from the conventional plug gauge in that each gauge of the set has two ends of the same diameter concentrically arranged with respect to each other. The reduced center portion of the gauge enables these two cylindrical surfaces to be easily and accurately formed on a centerless grinder so that they will not only be of the same diameter but will have the desired concentricity. While the set illustrated includes a row of plus and minus gauges with reference to a nominal gauge of ½", it will be appreciated that a similar set of plus and minus gauges could be provided with a nominal gauge of any other size.

Various changes may be made in the details of construction without departing from the spirit and scope of the invention as defined by the appended claims.

I claim:

1. A set of combined plug gauges and layout pins comprising a pluraltiy of rod-like bodies, each having cylindrical ends of the same diameter and concentrically arranged with respect to each other, one of said bodies having its ends of a diameter that may be regarded as nominal, the remaining bodies being divided into two groups one of which has the ends of the bodies forming that group differing from the nominal diameter by progressively increasing equal increments and the other group having the ends of its bodies differing from the nominal diameter by progressively increasing equal decrements whereby by a proper selection of a plug gauge from one group and associating it with either the nominal gauge or a gauge from the other group limits of permissible tolerance can be readily established.

2. A set of combined plug gauges and layout pins comprising a plurality of rod-like bodies, each having cylindrical ends of the same diameter and concentrically arranged with respect to each other, one of said bodies having its ends of a diameter that may be regarded as nominal, the remaining bodies being divided into two groups one of which has the ends of the bodies forming that group differing from the nominal diameter by progressively increasing equal increments and the other group having the ends of its bodies differing from the nominal diameter by progressively increasing equal decrements whereby by a proper selection of a plug gauge from one group and associating it with either the nominal gauge or a gauge from the other group limits of permissible tolerance can be readily established, each gauge having its center portion of reduced size as compared with its ends and on which the size of the ends is displayed.

References Cited in the file of this patent

UNITED STATES PATENTS

| | | |
|---|---|---|
| 1,438,634 | Clifford et al. | Dec. 12, 1922 |
| 1,460,548 | Koon et al. | July 3, 1923 |
| 1,547,279 | Wilson | July 28, 1925 |
| 2,493,233 | Dower | Jan. 3, 1950 |

FOREIGN PATENTS

| | | |
|---|---|---|
| 74,101 | Sweden | Apr. 13, 1932 |

OTHER REFERENCES

Publication—Iron Age, February 19, 1920, page 354 shows a set of plug gauges. (Copy in Library.)

Publication, Bulletin No. FL-1-45, The Sheffield Corporation, Dayton 1, Ohio. Rec'd. in Div. 66, June 13, 1949.